United States Patent [19]

Miyazawa et al.

[11] Patent Number: 5,653,357
[45] Date of Patent: Aug. 5, 1997

[54] LAMINATED DRAW-FORMED CONTAINER HAVING EXCELLENT FLAVOR-RETENTIVITY AND SHOCK RESISTANCE

[75] Inventors: Tetsuo Miyazawa, Ayase; Toshio Sue, Tokyo; Katsuhiro Imazu, Yokohama, all of Japan

[73] Assignee: Toyo Seikan Kaisha, Ltd., Tokyo, Japan

[21] Appl. No.: 322,560

[22] Filed: Oct. 13, 1994

[30] Foreign Application Priority Data

Oct. 14, 1993 [JP] Japan ................... 5-257222

[51] Int. Cl.⁶ ............................................. B32B 1/00
[52] U.S. Cl. ................................... 220/453; 220/458
[58] Field of Search .................... 220/453, 454, 220/456, 458, 604, 608, 609

[56] References Cited

U.S. PATENT DOCUMENTS

| | | | |
|---|---|---|---|
| 2,735,354 | 2/1956 | Edgar et al. | 220/458 X |
| 2,741,397 | 4/1956 | Shotton | 220/458 |
| 2,764,313 | 9/1956 | Foley et al. | 220/458 X |
| 2,856,094 | 10/1958 | Gloyer et al. | 220/458 |
| 2,877,922 | 3/1959 | De Cristoforo | 220/458 X |
| 3,219,729 | 11/1965 | Meyers et al. | 220/458 X |
| 4,450,977 | 5/1984 | Colburn et al. | 220/456 X |
| 4,452,375 | 6/1984 | Marcus | 220/456 X |
| 4,812,365 | 3/1989 | Saunders et al. | 220/454 X |
| 5,098,751 | 3/1992 | Tamura et al. | 220/453 X |
| 5,238,715 | 8/1993 | Wefers et al. | 220/453 X |

FOREIGN PATENT DOCUMENTS

| | | |
|---|---|---|
| 30109305 | 5/1984 | European Pat. Off. . |
| 94307409 | 8/1994 | Japan . |
| 2055687 | 3/1981 | United Kingdom . |

*Primary Examiner*—Steven M. Pollard
*Attorney, Agent, or Firm*—Sughrue, Mion, Zinn, Macpeak & Seas

[57] ABSTRACT

A laminated draw-formed container that is obtained by draw-forming a laminated material of a metal plate on which a resin film is laminated into a cup having bottom, wherein said resin film comprises a surface layer of a high molecular oriented copolymerized polyester derived from acid components of 85 to 97% of terephthalic acid and 3 to 15% of isophthalic acid, and a diol component, and a lower layer of a low molecular oriented copolymerized polyester (B) derived from acid components of 84.5 to 96.5% of terephthalic acid and 3.5 to 15.5% of isophthalic acid, the amount of the isophthalic acid being larger than that of the copolymerized polyester (A) of the surface layer, and a diol component, and said surface layer having a double refraction method orientation degree (Δ n) as represented by the following relation, $$\Delta n = n_1 - n_2$$

wherein $n_1$ is a refractive index in the direction of a maximum orientation of the film, and $n_2$ is a refractive index in the direction of thickness of the film, which is not smaller than 0.02. The laminated draw-formed container exhibits markedly improved dent resistance and corrosion resistance even after the container is preserved, as well as improved adhesion property and workability, and prevents the adsorption of flavor components and the elution of resin components into the content, making it possible to greatly improve flavor retentivity of the content.

12 Claims, 2 Drawing Sheets

LAMINATED DRAW-FORMED CONTAINER HAVING EXCELLENT FLAVOR-RETENTIVITY AND SHOCK RESISTANCE

BACKGROUND OF THE INVENTION

1. Field of the Invention

The present invention relates to a laminated draw-formed container having excellent flavor-retentivity and shock resistance (dent resistance). More specifically, the invention relates to a container which is obtained by draw-forming a material comprising a metal plate on which is laminated a polyester film, the container exhibiting improved performance for retaining flavor of the content and improved dent resistance.

2. Description of the Prior Art

Conventional side seamless cans can be represented by those obtained by subjecting a metal blank such as an aluminum plate, a tin plate or a tin-free steel plate to at least one stage of draw working between a drawing die and a punch thereby to form a cup consisting of a barrel without side seam and a bottom that is connected to the barrel without forming seam, and then, as required, subjecting the barrel to the ironing between an ironing punch and a die to reduce the thickness of the barrel of the container. It has also been known to reduce the thickness of the side wall relying upon the bend-elongation by using the corner portion of a redrawing die (Japanese Patent Publication No. 501442/1981).

As a method of covering side seamless cans with an organic material, furthermore, there has been known a method of laminating a resin film on a metal blank of before it is formed into a can in addition to the generally employed method of applying an organic paint onto the formed cans. Japanese Patent Publication No. 34580/1984 teaches use of a metal blank on which is laminated a polyester film derived from terephthalic acid and tetramethylene glycol. It has further been known to produce redraw-formed cans relying upon the bend-elongation by using a metal plate coated with a vinyl organosol, an epoxy, a phenolics, a polyester or an acryl.

Japanese Patent Application No. 101930/1991 filed by the present inventors discloses a coated metal plate for cans comprising a laminate of a metal plate, a polyester film layer composed of an ethylene terephthalate unit as a chief component and, as required, an adhesive primer layer interposed between the metal plate and the polyester film layer, said polyester film layer having an X-ray diffraction intensity ratio as defined by the following formula (1), $$R_X = I_A / I_B \quad (1)$$

wherein $I_A$ denotes an X-ray diffraction intensity by a diffraction plane which is in parallel with the surface of the polyester film and having a spacing of about 0.34 nm (CuKα X-ray diffraction angle of from 24° to 28°), and IB denotes an X-ray diffraction intensity by a diffraction plane which is in parallel with the surface of the polyester film and having a spacing of about 0.39 nm (CuKα X-ray diffraction angle of from 21.5° to 24°), of from 0.5 to 15 and an aniostropic index of in-plane orientation of crystals of not greater than 30.

It has long been known to laminate polyesters in the form of a plurality of layers on a base member such as a metal. For instance, U.S. Pat. No. 2,961,365 discloses a laminate obtained by laminating a linear terephthalate polyester via an adhesive layer of a polyester which comprises a polymethylene glycol with 2 to 10 carbon atoms and isophthalic acid, hexahydroterephthalic acid, or a dibasic acid of a combination thereof with terephthalic acid.

Japanese Laid-Open Patent Publication No. 176144/1991 discloses a laminated material having excellent flavor retentivity comprising a co-extruded resin laminate of a first resin layer of amorphous or low-crystalline saturated polyester resin having a glass transition temperature of not lower than 40° C. and a second resin layer of a crystalline polybutylene terephthalate resin which is a copolymer of a 1,4-butane diol and terephthalic acid.

Moreover, Japanese Laid-Open Patent Publication No. 42643/1993 discloses a biaxially oriented polyester film that is used being laminated on a metal, the surface layer of the polyester film of the side laminated on the metal having a melting point of not lower than 170° C. but not higher than 220° C. and the surface layer of the polyester film of the side not laminated on the metal having a melting point of not lower than 220° C. but not higher than 255° C.

With the metal blank coated with an organic film in advance, however, the organic film is subject to be damaged by tools in the draw-forming step, and the metal is actually or latently exposed at portions where the film is damaged, permitting the metal to be eluted out or corroded at such portions. In producing the seamless cans, furthermore, there takes place such a plastic flow that the size increases in the direction of height of the can and the size decreases in the circumferential direction of the can. This plastic flow causes the adhesion force to decrease between the surface of the metal and the organic film and further causes the adhesion force to decrease between them with the passage of time due to residual distortion of the organic film. Such a tendency becomes conspicuous particularly when the content is hot-canned or when the canned content is sterilized at low temperatures or at high temperatures.

In the case of a conventional draw-formed can made of a laminate of a polyester composed of a polybutylene terephthalate (PBT) as a chief component, adhesion property to the metal base plate is favorable and workability is fairy good when the crystallinity is suppressed low leaving, however, a problem in that barrier property of the film against the corrosive component is of the order of about one-half that of polyethylene terephthalate/isophthalate (PET/I) permitting the film to stick to the tools, as well as a problem in regard to heat resistance of the container.

In the case of a draw-formed can using a laminate of a film of polyethylene terephthalate (PET) or PET/I, on the other hand, excellent barrier property is obtained against corrosive components and fairly good workability is obtained accompanied, however, by a problem in that the coating film of the can loses shock resistance and, particularly, dent resistance to a great degree with the passage of time after the content is packaged in the obtained container.

In this specification, the dent resistance stands for a test of determining whether the film of the container can withstand the breakage or peeling when impact or shock is given to the container to such a degree as to leave a trace of hit, and serves as a very important item for evaluating the practical durability of the canned content.

A proposal for using a plurality of polyester layers is to eliminate the defect of the case of when a single polyester layer is used. With the combination of a plurality of polyester layers proposed so far, however, problems still remain in obtaining a deep-draw-formed container and in regard to shock resistance and, particularly, dent resistance of the draw-formed container with the passage of time. Besides, the containers are not still satisfactory in regard to flavor-retentivity of the content.

It has been known that the container having the internal surface that comes into contact with the content and is composed of a thermoplastic resin exhibits off-flavor (loss of flavor of the content) to a striking degree compared with the contains having the internal surfaces coated with an epoxy-phenol paint.

The off-flavor of the container using a thermoplastic resin inclusive of polyester as an inner surface material is attributed to, first, that the flavor components of the content is adsorbed by the resin film layer and, second, that low-molecular components in the resin film and metal components under the film elute out into the content.

Employment of a laminated layer structure of a polyester film on the surface of the metal and employment of a copolymerized polyester layer having a low crystallinity or a low melting point as the lower layer that comes into contact with the metal, are effective in increasing the adhesion between the metal and the film, in enhancing the draw workability and in improving the shock resistance or the dent resistance accompanied, however, by a decrease in the crystallinity, a drop in the melting point and, hence, permitting the flavor components to be adsorbed to a large extent. Moreover, the low-molecular-weight components increase and the tendency of elution increases, too.

SUMMARY OF THE INVENTION

It is therefore an object of the present invention to provide a draw-formed container made of a polyester film-laminated material having excellent flavor retentivity, shock resistance and, particularly, dent resistance yet maintaining excellent workability and adhesion property.

According to the present invention, there is provided a laminated draw-formed container that is obtained by draw-forming a laminated material of a metal plate on which a resin film is laminated into a cup having bottom, wherein said resin film comprises a surface layer of a high molecular oriented copolymerized polyester derived from acid components of 85 to 97% of terephthalic acid and 3 to 15% of isophthalic acid, and a diol component, and a lower layer of a low molecular oriented copolymerized polyester (B) derived from acid components of 84.5 to 96.5% of terephthalic acid and 3.5 to 15.5% of isophthalic acid, and a diol component, the amount of the isophthalic acid being larger than that of the copolymerized polyester (A) of the surface layer, and said surface layer having a double refraction method orientation degree ($\Delta$ n) as represented by the following relation (2), $$\Delta n = n_1 - n_2 \quad (2)$$

wherein $n_1$ is a refractive index in the direction of a maximum orientation of the film, and $n_2$ is a refractive index in the direction of thickness of the film, which is not smaller than 0.02.

In the present invention, the diol component in the copolymerized polyester (A) which is the surface layer and the diol component in the copolymerized polyester (B) which is the lower layer should be those which are composed of an ethylene glycol as a chief component from the standpoint of flavor retentivity.

From the standpoint of workability, adhesion property, shock resistance and flavor retentivity, the copolymerized polyester (B) which is the lower layer should contain isophthalic acid in an amount larger by at least 0.5% and, particularly, by at least 1.0% than that in the copolymerized polyester (A) which is the surface layer and, besides, the copolymerized polyester (B) which is the lower layer should further have a melting point which is higher than 220° C. and a glass transition point which is 65 g or higher.

The copolymerized polyester (B) which is the lower layer should have a melting point which is lower by at least 0.5° C. than the copolymerized polyester (A) which is the surface layer, and should further have a double refraction method orientation degree ($\Delta$ n) of not smaller than 0.001 from the standpoint of maintaining balance among the above-mentioned properties.

DETAILED DESCRIPTION OF THE INVENTION

In the laminated draw-formed container of the present invention, both a polyester of the surface layer side and a polyester of the lower layer side are copolymerized polyesters of terephthalic acid and isophthalic acid. Use of copolymerized polyesters of terephthalic acid and isophthalic acid is important in obtaining the action as a barrier layer against the migration of flavor component of the content into the films and in preventing the adsorption of flavor components.

A polyester containing isophthalic acid as an acid component has a feature in that it exhibits a large barrier effect against various components and that it adsorbs the components little.

From such a point of view, the present invention uses copolyesters of terephthalic acid and isophthalic acid for forming the surface layer and the lower layer.

In the present invention, the surface layer is composed of a high molecular oriented copolymerized polyester (A) derived from acid components of 85 to 87% of terephthalic acid and 3 to 15% of isophthalic acid, and a diol component.

In the copolymerized polyester which is the surface layer, when the content of the isophthalic acid is larger than the above range, barrier effect is not exhibited to a sufficient degree against the adsorption of flavor components of the content and dent resistance is not, either, imparted to the formed can to a sufficient degree. The isophthalic acid that is contained in an amount in the above-mentioned range helps maintain the molecular orientation at a high level in a state of the draw-formed container.

The lower layer is composed of a low molecular oriented copolymerized polyester (B) derived from acid components of 84.5 to 96.5% of terephthalic acid and 3.5 to 15.5% of isophthalic acid, and a diol component, the amount of the isophthalic acid being larger than that in the copolymerized polyester (A) which is the surface layer.

In the copolymerized polyester (B) which is the lower layer, when the content of the isophthalic acid is larger than the above range, low molecular components are contained in large amounts in the copolymerized polyester and elute out, causing the flavor retentivity to decrease. When the content of the isophthalic acid is smaller than the above range, on the other hand, adhesion property to the metal becomes poor, workability decreases, the thermal crystallization increases after melted, and mechanical strength and shock resistance decrease.

The isophthalic acid that is contained in an amount in the above-mentioned range helps maintain the flavor retentivity at an excellent level, increase adhesion property to the metal base material and workability, lower the maximum crystallinity, and increase toughness of the laminated films.

It is important that the copolymerized polyester (B) of the lower layer contains the isophthalic acid in an amount which is larger by at least 0.5% and, particularly, by at least 1.0% than that of the copolymerized polyester (A) of the surface layer. With the isophthalic acid being contained in an amount larger than in the surface layer, adhesion property is maintained to a sufficient degree even for the severe working such as the draw working and, besides, crystallization is prevented during the melting and the heat-treatment, contributing to markedly improving the dent resistance.

In the copolymerized polyesters used in the present invention, it is desired that the acid components substantially comprise terephthalic acid and isophthalic acid only without containing aliphatic component. When the aliphatic component is contained, the flavor components of the content are adsorbed by the film or the resin components elute out into the content, which is not desirable.

Because of the same reason, it is also desired that the diol component in the copolymerized polyesters is composed of an ethylene glycol as a chief component. This is because, the copolymerized polyester containing terephthalic acid and isophthalic acid as acid components and containing a glycol component composed of an ethylene glycol, adsorbs the flavor components little and permits the resin components to elute out in the least amounts into the content.

From the standpoint of adsorbing the flavor components in small amounts and permitting the resin components to elute out in the least amounts into the content, the copolymerized polyester (B) of the lower layer having a small degree of molecular orientation should have a glass transition point of not lower than 65° C. and, preferably, not lower than 70° C.

Moreover, the copolymerized polyester (B) of the lower layer should have a melting point which is lower by at least 0.5° C. and, preferably, by 0.5° to 15° C. than the melting point of the copolymerized polyester (A) of the surface layer from the standpoint of maintaining high degree of molecular orientation in the copolymerized polyester of the surface layer even after it is laminated.

Furthermore, the copolymerized polyester (B) of the lower layer having a double refraction method orientation degree (Δ n) which is not smaller than 0.001 is desirable from the standpoint of suppressing the thermal crystallinity at the time of lamination or during the subsequent heat-treatment, enhancing the toughness of the copolymerized polyester of the lower layer and maintaining the adhesion property at an excellent level.

Figure 1:
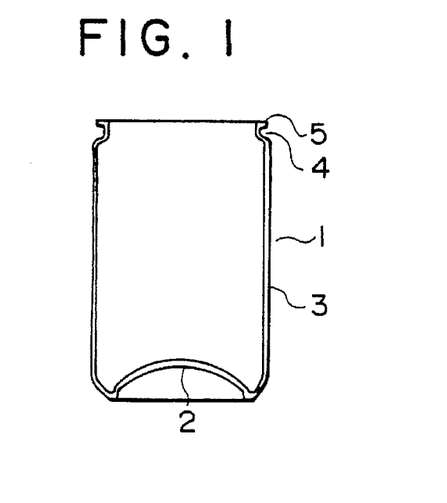
FIG. 1 is a sectional view illustrating a laminated draw-formed container of the present invention.

Referring to FIG. 1 which illustrates a draw-formed can of the present invention, the draw-formed can 1 is formed by deep-draw-forming (draw-redraw-forming) the aforementioned coated metal plate, and has a bottom portion 2 and a side wall portion 3. As desired, a flange portion 5 is formed at the upper end of the side wall portion 3 via a neck portion 4. In this can 1, the side wall portion 3 has a thickness which is reduced by bend-elongation compared with the bottom portion 2.

Figure 2:
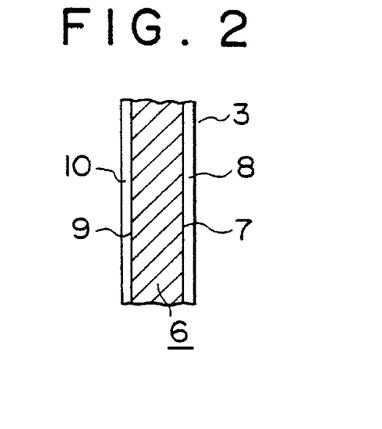
FIG. 2 is a diagram illustrating, in cross section, the structure of the side wall of the laminated draw-formed container according to an embodiment of the present invention.

Reference is now made to FIG. 2 which illustrates in cross section the structure of the side wall portion 3 which comprises a metal base member 6 and a laminated film 9 of a low molecular oriented copolymerized polyester layer 7 located on the side of the metal and a high molecular oriented copolymerized polyester layer 8 located on the side of the front surface. The metal base member 6 has an outer film 10 which may be the same as the inner composite film 9 or may be an ordinary paint or a resin film for cans.

Figure 3:
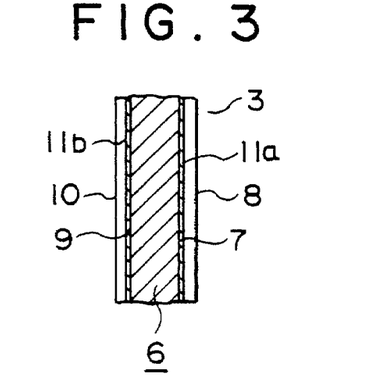
FIG. 3 is a diagram illustrating, in cross section, the structure of the side wall of the laminated draw-formed container according to another embodiment of the present invention.

Reference is now made to FIG. 3 which illustrates, in cross section, another structure of the side wall portion which is the same as that of the case of FIG. 2 except that a primer layer 11 for adhesion is provided between the low molecular oriented copolymerized polyester layer 7 and the metal base member 6.

In any one of these cases, the cross-sectional structure of the bottom portion 2 is the same as the cross-sectional structure of the side wall portion 3 with the exception that the bottom portion 2 has not been subjected to the draw-forming.

(Metal blank)

In the present invention, a variety of surface-treated steel plates and light metal plates such as of aluminum can be used as the metal plate.

The surface-treated steel plate will be a cold-rolled steel plate which is annealed and is then subjected to the secondary cold rolling followed by one or two or more kinds of surface treatments such as zinc plating, tin plating, nickel plating, electrolytic chromate treatment and chromate treatment. A preferred surface-treated steel plate will be an electrolytic chromate-treated steel plate having a metal chromium layer of 10 to 200 mg/m$^2$ and a chromium oxide layer of 1 to 50 mg/m$^2$ (reckoned as metal chromium) which is excellent in film adhesion property and corrosion resistance in combination. Another example of the surface-treated steel plate is a hard tin plate which is plated with tin at a rate of from 0.5 to 11.2 g/m$^2$. It is desired that the tin plate has been treated with chromic acid or with chromic acid and phosphoric acid to such an extent that the amount of chromium is from 1 to 30 mg/m$^2$ reckoned as metal chromium.

There can be further used an aluminum-coated steel plate that is plated with aluminum or to which aluminum is adhered with pressure.

Examples of the light metal plate include a so-called aluminum plate and an aluminum alloy plate. The aluminum alloy plate which is excellent in corrosion resistance and workability has a composition of 0.2 to 1.5% by weight of manganese, 0.8 to 5% by weight of magnesium, 0.25 to 0.3% by weight of zinc, 0.15 to 0.25% by weight of copper, and the remainder being aluminum. It is desired that the light metal plate has been treated with chromic acid or with chromic acid and phosphoric acid to such an extent that the amount of chromium is from 20 to 300 mg/m$^2$ reckoned as metal chromium.

The thickness of the metal blank, i.e., the thickness ($t_B$) of the bottom of the can may vary depending upon the kind of the metal, use or size of the container, but should generally be from 0.10 to 0.50 mm. In the case of the surface-treated steel plate, the thickness should be from 0.10 to 0.30 mm and in the case of the light metal plate, the thickness should be from 0.15 to 0.40 mm.

(Composite film)

The surface layer (I) of the composite film used in the present invention comprises a high molecular oriented copolymerized polyester (A) derived from acid components of 85 to 97% of terephthalic acid and 3 to 15% of isophthalic acid, and a diol component.

It is desired that the acid components in the copolymerized polyester (A) are 87 to 95% of terephthalic acid and 3 to 15% of isophthalic acid from the stand point of retaining flavor. As acid components, there may be contained other dibasic acid compounds in small amounts, for example, in amounts of not larger than one mol %. It is, however, desired that aliphatic dibasic acid is not contained from the standpoint of preventing the adsorption of flavor components and suppressing the elution of polyester components.

The diol component in the copolymerized polyester should chiefly be an ethylene glycol. It is desired that not smaller than 95 mol % and, particularly, not smaller than 98 mol % of the diol component is an ethylene glycol from the standpoint of molecular orientation and barrier property against corrosive components and flavor components.

In this specification, examples of the dibasic acid other than terephthalic acid and isophthalic acid include P-β-oxyethoxybenzoic acid, naphthalene 2,6-dicarboxylic acid, diphenoxyethane-4,4'-dicarboxylic acid, 5-sodium sulfoisophthalic acid, hexahydroterephthalic acid, adipic acid, sebacic acid and the like acid. Examples of the diol component other than ethylene glycol include such glycol components as propylene glycol, 1,4-butanediol, neopentyl glycol, 1,6-hexylene glycol, diethylene glycol, triethylene glycol, cyclohexane dimethanol, ethylene oxide adduct of bisphenol A, and the like. These components should be contained in small amounts but are not the essential components.

The high molecular oriented copolymerized polyester (A) of the surface layer should have a molecular weight over a range of forming a film, and the solvent should have an inherent viscosity [η] over a range of from 0.5 to 1.5 as measured by using a phenol/tetrachloroethane mixture solvent.

The lower layer (II) of the composite film comprises the low molecular oriented copolymerized polyester (B) derived from acid components of 84.5 to 96.5% of terephthalic acid and 3.5 to 15.5% of isophthalic acid, and a diol component, the amount of the isophthalic acid being larger than that in the copolymerized polyester (A) of the surface layer.

The copolymerized polyester (B) containing 85 to 94% of terephthalic acid and 6 to 15% of isophthalic acid, the amount of the isophthalic acid being larger by at least 0.5% and, particularly, by at least 1.0% than that of the copolymerized polyester (A) of the surface layer, is desirable from the standpoint of decreasing the adsorption of flavor components, preventing the elution of polyester components, enhancing the shock resistance, and improving the adhesion property to the metal base member.

Like the copolymerized polyester (A), the copolymerized polyester (B) may contain, as acid components, other dibasic acid compounds in small amounts, for example, in amounts of not larger than 1 mol %. It is, however, desired that the aliphatic dibasic acid is not contained from the standpoint of preventing the adsorption of flavor component and suppressing the elution of polyester components. Similarly, furthermore, it is desired that the diol component is chiefly composed of an ethylene glycol. It is desired that not smaller than 95 mol % and, particularly, not smaller than 98 mol % of the diol component is composed of an ethylene glycol from the standpoint of molecular orientation and barrier property against corrosive components and flavor components.

The copolymerized polyester (B) of the lower layer should have a glass transition point of not lower than 65° C. and, particularly, not lower than 70° C. from the standpoint of preventing the copolymerized polyester from eluting into the content.

The lower layer polyester (B) which serves as an adhesive should have an exceptionally high molecular weight and should further have an inherent viscosity [η] over a range of from 0.5 to 1.5 as measured by the method described above.

The copolymerized polyesters (A) and (B) of the surface layer and of the lower layer used in the present invention may be copolymerized polyesters in a strict sense or may be copolymerized polyesters in a not so strict sense. For instance, they may be a blend of the copolymerized polyesters or a blend of a copolymerized polyester and a homopolyester. When a composition of a copolyester is melted, ester units are exchanged enabling the composition to be homogenized, which accounts for why such a blend can be used.

The laminated film used in the present invention should have a thickness of 2 to 100 μm and, particularly, 5 to 50 μm from the standpoint of protecting the metal and workability. The ratio of the thickness of the surface layer (I) to the thickness of the lower layer (II) should be over a range of from 9:95 to 95:5 and, particularly, from 5:95 to 90:10 from the standpoint of balance among shock resistance, workability and flavor retentivity.

The composite film can be produced by simultaneously extruding the above layers (I) and (II), or by coating one layer with another polyester layer that is extruded, or by the sandwich lamination according to which a polyester composition which is the same, for example, as the layer (II) is extruded between the film of the layer (I) and the film of the layer (II) followed by press-adhesion by the application of heat.

The composite film should generally be biaxially drawn. The degree of biaxial orientation can be confirmed by the X-ray diffraction method, polarized fluorescent method, double refraction method or density-gradient tube method.

The composite film may, as a matter of course, be blended with widely-known blending agents for films such as an antiblocking agent like amorphous silica, a pigment like titanium dioxide (titanium white), a variety of antistatic agent and a lubricating agent according to a known recipe.

Though generally not needed, when a primer for adhesion is used, it is generally desired to treat the surface of the biaxially drawn copolyester film with corona discharge in order to enhance adhesion property of the adhesive primer to the film. The treatment with corona discharge should be executed to such a degree that the wet tension is not smaller than 44 dyne/cm.

It is further allowable to execute the widely known surface treatment for improving adhesiveness such as treating the film with plasma or with frame, or to apply coating for improving adhesiveness such as an urethane resin coating, a modified polyester resin coating or the like coating.

(Method of preparation)

According to the present invention, both surfaces of the metal base member can be provided with the above-mentioned films. In the present invention, furthermore, when the composite film is used as the inner film, the outer film may be any one of a widely known paint applied to the outer surface of the cans, a widely known polyester film or any other plastic film. Examples of the paint include thermosetting resin paints that have heretofore been used for the cans, such as phenol aldehyde resin, furane resin, xylene formaldehyde resin, ketone formaldehyde resin, urea resin, melamine resin, aniline resin, alkyd resin, guanamine resin, unsaturated polyester resin, epoxy resin, thermosetting acrylic resin, triarylcyanulate resin, bismaleimide resin, oleoresinous paint, thermosetting acrylic paint, thermosetting vinyl paint, which may be used in one kind or in two or more kinds in combination.

The adhesive primer that is provided as required between the polyester film and the metal blank exhibits excellent adhesiveness to both the metal blank and the film. A representative example of the primer paint excellent in both adhesion property and corrosion resistance is a phenol epoxy paint comprising a resol-type phenol-aldehyde resin derived from various phenols and a formaldehyde, and a bisphenol epoxy resin and, particularly, a paint which contains a phenol resin and an epoxy resin at a weight ratio of 50:50 to 5:95 and, particularly, 40:60 to 10:90.

The adhesive primer layer should generally have a thickness of from 0.01 to 10 μm. The adhesive primer layer may be formed on the metal blank in advance or may be formed on the polyester film in advance.

According to the present invention, the above laminated film is so laminated that the layer (I) is on the side of the front surface and the layer (II) is on the metal side, and the laminated material is deep-draw-formed into a cup with bottom between a punch and a die, and, as required, the thickness of the side wall of the cup is reduced by bend-elongation or ironing in the step of draw-forming. Then, the film layer of the cup with bottom that is formed is subjected to at least one stage of heat treatment at a temperature lower than the melting point of the polyester composition.

Lamination of the metal blank and the composite film is carried out by, for example, adhering them together with pressure under a condition where the film is melted only at a portion that comes into contact with the metal blank. In this case, the metal blank is heated in advance at a temperature higher than the softening point of the polyester (thermally fixing temperature of the film), and the laminate is quickly quenched immediately after the lamination.

According to another method, the composite polyester film and the metal blank are adhered together with pressure via an adhesive primer layer provided for either one of them, to accomplish the lamination.

According to the present invention, the laminated film is laminated on the metal base material in such a manner that a double refraction method orientation degree ($\Delta n$) which is not smaller than 0.02 remains in the surface layer and, preferably, that a double refraction method orientation degree ($\Delta n$) which is not smaller than 0.001 remains even in the lower layer.

Figure 4:
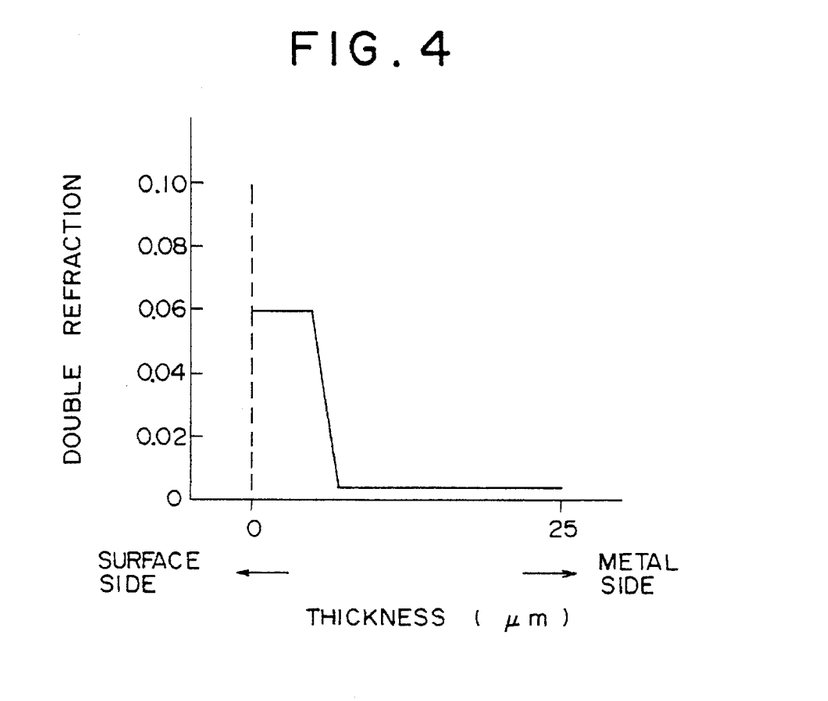
FIG. 4 is a graph showing the distribution of molecular orientation degrees in the direction of thickness of the film of the laminated draw-formed container of the present invention.

FIG. 4 illustrates a distribution of orientation degrees in the direction of thickness of the laminated film in a state of a draw-formed container. A high orientation degree near the surface layer helps improve the dent resistance, and a low orientation degree on the side of the metal base material helps increase the workability of the laminate.

It will be understood that the orientation degree of the copolymerized polyester (B) of the lower layer which is not zero is effective in suppressing the crystallization during the heat treatment of the copolymerized polyester (B). It will be further understood that a difference in the melting point between the copolymerized polyester (A) of the surface layer and the copolymerized polyester (B) of the lower layer is desirable in maintaining the molecular orientation degree of the surface layer as high as possible.

Figure 5:
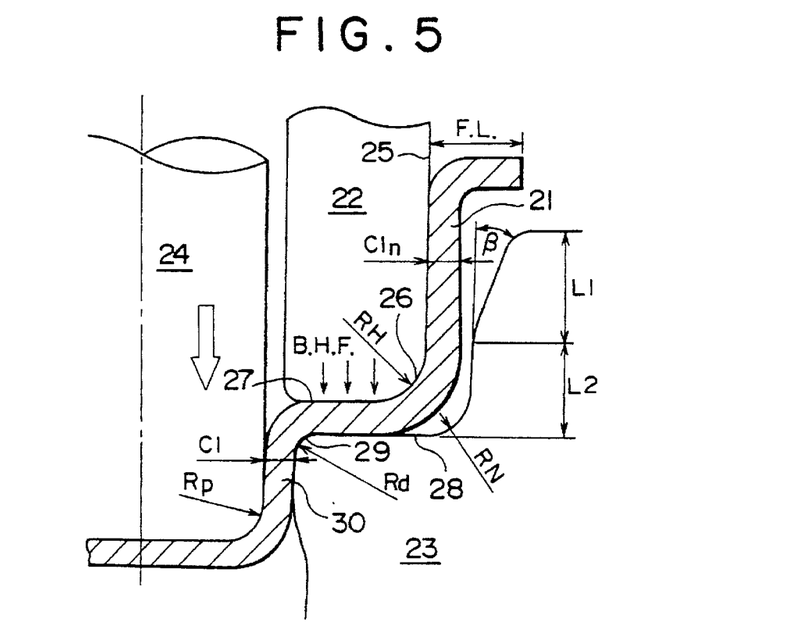
FIG. 5 is a diagram explaining the redraw-forming.

The thus prepared laminate is draw-formed by a means that has been known per se. When, for example, a deep-draw-forming (draw-redraw-forming) is employed as shown in FIG. 5, a pre-draw-formed cup 21 made of the coated metal plate is held by an annular holding member 22 inserted in the cup and a redrawing die 23 located beneath it. In concentric with the holding member 22 and the redrawing die 23, a redrawing punch 24 is provided so as to enter into, and come out from, the holding member 22. The redrawing punch 24 and the redrawing die 23 are moved relative to each other so as to be in mesh with each other.

Then, the side wall of the pre-draw-formed cup 21 passes through a curvature corner portion 26 from the outer peripheral surface 25 of the annular holding member 22, vertically bent inwardly of the diameter, passes through a portion defined by the annular bottom surface 27 of the annular holding member 22 and the upper surface 28 of the redrawing die 23, bent nearly vertically in the axial direction by a working corner portion 29 of the redrawing die 23, and is formed into a deep-draw-formed cup 30 having a diameter smaller than that of the pre-draw-formed cup 21. Thickness of the side wall can be further reduced by bend-elongation.

In the case of a deep-draw-formed can, the drawing ratio RD defined by the following relation (3), $$R_D = \frac{D}{d} \qquad (3)$$

where D is a diameter of the laminated material that is sheared, and d is a diameter of the punch, should lie within a range of from 1.1 to 3.0 in the first stage, and should lie within a range of from 1.5 to 5.0 as a total.

In the case of the bend-elongation, furthermore, the thickness of the side wall of the can should be reduced to 5 to 45% and, particularly, 5 to 40% of the blank thickness ($t_B$).

According to the present invention, thereafter, the draw-formed container is, as required, subjected to the heat treatment to remove residual distortion from the film. The heat treatment can be executed by a widely known heating device such as an infrared-ray heater, a hot air circulation furnace, an induction heater, and the like. The heat treatment may be carried out in one stage, in two stages or in many more stages. The heat treatment should be carried out at a temperature of from 180° to 240° C.

After the heat treatment, the container needs not be quickly quenched. A film or a laminated plate can be quickly quenched with ease, but a container having a three-dimensional shape and a large heat capacity in the case when it is made of a metal can be quenched with difficulty when it is carried out on an industrial scale. According to the present invention, however, the crystal growth is suppressed by the aforementioned action and excellent properties are obtained in combination. It is of course allowable to employ any quickly quenching means such as blowing the cold air, sprinkling the cold water or the like.

EXAMPLES

The invention will now be described by way of the following Examples.

Characteristic values of the present invention are measured in compliance with the methods described below.

(1) Melting point Tg (glass transition temperature).

Found by using a differential thermal scanning calorimeter DSC (manufactured by Perkin Elmer Co.). As for the laminated film, values are measured at a moment when single layer films of each of the compositions are prepared. 4 Milligrams of a sample is melted at 280° C. for one minute in a nitrogen stream and is quenched at a cooling rate of 320°

C./minute. The temperature is then raised at a rate of 20° C./minute to measure a glass transition temperature, and a maximum temperature of an endothermic peak based upon the melting of crystals is regarded to be a melting point.

(2) Double refraction.

The laminated plate is cut into a square of a side of 5 mm, and the sampling portion on the bottom of the can is as shown in FIG. 1, i.e., the central portion of the bottom of the can is cut into a square of a side of 5 mm. The thus cut metal plates are dissolved in 50% hydrochloric acid to isolate free films. The films are then dried in vacuum for at least 24 hours to obtain samples.

The laminated plate and a predetermined position of the film on the can are buried in an epoxy resin, and are cut into 3 μm so as to be in parallel with the direction of thickness (corresponds to $n_2$) and with the direction of a maximum orientation of the biaxially oriented plane (corresponds to $n_1$), and retardation is measured using a polarization microscope to find a double refraction.

(3) IV (inherent viscosity).

Single layer films of each of the compositions for the two-layer film are prepared and are dissolved each in an amount of 200 mg in a phenol/1,1,2,2-tetrachloroethane mixture solvent (weight ratio of 1/1) maintained at 110° C., and are measured for their specific viscosities at 30° C. by using an Ubbelohde's viscometer. The inherent viscosity was found in compliance with the following relation (4), $$[\eta] = \frac{-1 + \sqrt{1 + 4K'\eta_{SP}}}{2K'C} \text{ (dl/g)} \quad (4)$$

K': Huggins' constant (=0.33),

C: concentration (g/100 ml), $\eta_{SP}$: specific viscosity=(Falling time of solvent31 falling time of solvent)/(Falling time of solvent)

(4) Testing the flavor.

Sample cans of Examples and Comparative examples were filled with a cola and were preserved at room temperature for four weeks. The thus preserved cola and a cola (Control) in a PET bottle placed in the market are evaluated by twenty testing persons.

Evaluations as compared with the Control are as follows:

□: Less then two testing persons feel the difference.

Δ: Three to ten testing persons feel the difference.

X: Eleven or more testing persons feel the difference.

(5) Testing the preservation of cola.

A steel rod 10 mm in diameter is placed at the bottom radius portion of a can filled with a cola and maintained at 5° C., and a weight of 500 g is permitted to fall from a height of 60 mm to give impact thereto. The condition of the can is checked after it is preserved for a year at room temperature.

EXAMPLE 1

A laminate comprising, as a polyester layer I, a copolymerized polyester (Tm=228° C., IV=0.65) of terephthalic acid/isophthalic acid (weight ratio of 88/12) and an ethylene glycol and, as a polyester layer II, a copolymerized polyester (Tm=225° C., Tg=73° C., IV=0.65) of terephthalic acid/ isophthalic acid (weight ratio of 87/13) and an ethylene glycol, was drawn at 120° C. into 3.0 times in the vertical direction and into 3.0 times in the lateral direction, and was heat-treated at 180° C. to obtain a biaxially drawn film a. The two-layer film was comprised of a polyester layer I of 4 μm in thickness and a polyester layer II of 16 μm in thickness, and possessed a total thickness of 20 μm.

Then, the two-layer film was heat-laminated on both surfaces of a tin-free steel plate (TFS) having a blank thickness of 0.175 mm and a tempering degree of DR-9 at a temperature near the melting point of the inner layer (II), and was quickly quenched with the water to obtain a metal plate coated with the laminate. Vaseline was applied onto the coated megal plate which was then punched into a disc of a diameter of 179 mm to obtain a shallow cup that was draw-formed in a customary manner at 80° C. The drawing ratio in this step was 1.56. Next, the cup was pre-heated at 80° C., and was subjected to primary and secondary thickness-reducing redraw-formings.

| Primary redrawing ratio | 1.37 |
|---|---|
| Secondary redrawing ratio | 1.27 |

The thus obtained deep-draw-formed cup exhibited the following properties:

| Diameter of cup | 66 mm |
|---|---|
| Height of cup | 128 mm |
| Change in the thickness of the side wall | −20% (with respect to the blank thickness) |

The deep-draw-formed cup was domed in a customary manner at 80° C., and was heat-treated at 215° C. After left to cool, the cup was trimmed at its open edge portion, printed on the curved surface and was flanged to obtain a 350-g two-piece can. The can was filled with a cola, tested in regard to flavor retentivity, and was further examined in regard to inner surface condition of the can and leakage after it was preserved. Table 1 shows the results of evaluation which were favorable.

EXAMPLE 2

A laminate comprising, as a polyester layer I, a copolymerized polyester (Tm=228° C., IV=0.65) of terephthalic acid/isophthalic acid (weight ratio of 88/12) and an ethylene glycol and, as a polyester layer II, a copolymerized polyester (Tm=223° C., Tg=73° C., IV=0.60) of terephthalic acid/ isophthalic acid (weight ratio of 86/14) and an ethylene glycol, was drawn at 120° C. into 3.0 times in the vertical direction and into 3.0 times in the lateral direction, and was heat-treated at 180° C. to obtain a biaxially drawn film b. The two-layer film was comprised of a polyester layer I of 20 μm in thickness and a polyester layer II of 5 μm in thickness, and possessed a total thickness of 25 μm. By using this two-layer film, a 350-g two-piece can was obtained in the same manner as in Example 1. Table 1 shows the results of evaluation which were favorable.

EXAMPLE 3

A laminate comprising, as a polyester layer I, a copolymerized polyester (Tm=242° C., IV=0.58) of terephthalic acid/isophthalic acid (weight ratio of 95/5) and an ethylene glycol and, as a polyester layer II, a copolymerized polyester (Tm=240° C., Tg=75° C., IV=0.65) of terephthalic acid/ isophthalic acid (weight ratio of 94/6) and an ethylene glycol, was drawn at 120° C. into 3.3 times in the vertical direction and into 3.4 times in the lateral direction, and was heat-treated at 180° C. to obtain a biaxially drawn film c. The two-layer film was comprised of a polyester layer I of 2 μm in thickness and a polyester layer II of 12 μm in thickness, and possessed a total thickness of 14 μm. By using this two-layer film, a deep-draw-formed cup was prepared in the same manner as in Example 1 and a 350-g two-piece can was obtained in the same manner as in Example 1 but effecting the heat treatment at 225° C . Table 1 shows the results of evaluation which were favorable.

(dent portion) though no leakage was found. From the overall point of view, it was judged that the cans were not suited for practical use.

TABLE 1

| | Film | Surface layer Δn of laminated | Bottom of can | | Cola strong testing | |
|---|---|---|---|---|---|---|
| | | | Surface layer Δn | Lower layer Δn | Flavor testing | N = 100 after 1 year at room temperature |
| Examples | | | | | | |
| 1 | a | 0.06 | 0.06 | 0.005 | ○ | normal |
| 2 | b | 0.08 | 0.09 | 0.01 | ○ | normal |
| 3 | c | 0.04 | 0.04 | 0.005 | ○ | normal |
| Comparative Examples | | | | | | |
| 1 | d | 0.12 | 0.14 | 0.000 | X | Bottom radius portion and BHR portion corroded, pitting and leakage 78/100 |
| 2 | e | 0.04 | 0.05 | 0.000 | Δ | Bottom radius portion and BHR portion corroded |

Comparative Example 1

A laminate comprising, as a polyester layer I, a copolymerized polyester (Tm=228° C., IV=0.65) of terephthalic acid/isophthalic acid (weight ratio of 88/12) and an ethylene glycol and, as a polyester layer II, a copolymerized polyester (Tm=211° C., Tg=71° C., IV=0.60) of terephthalic acid/isophthalic acid (weight ratio of 80/20) and an ethylene glycol, was drawn at 120° C. into 3.0 times in the vertical direction and into 3.0 times in the lateral direction, and was heat-treated at 180° C./ to obtain a biaxially drawn film d. The two-layer film was comprised of a polyester layer I of 5 μm in thickness and a polyester layer II of 20 μm in thickness, and possessed a total thickness of 25 μm. By using this two-layer film, a 350-g two-piece can was obtained in the same manner as in Example 1. Table 1 shows the results of evaluation. After the cola was preserved, corrosion developed remarkably on the BHR portion and on the bottom radius portion (dent portion). Leakage developed in 78 cans out of 100 cans, from which it was judged that the cans were not suited for practical use.

Comparative Example 2

A laminate comprising, as a polyester layer I, a copolymerized polyester (Tm=257° C., IV=0.67) of terephthalic acid/isophthalic acid (weight ratio of 98/2) and an ethylene glycol and, as a polyester layer II, a copolymerized polyester (Tm=190° C., Tg=68° C., IV=0.61) of terephthalic acid/isophthalic acid (weight ratio of 70/30) and an ethylene glycol, was drawn at 120° C. into 3.0 times in the vertical direction and into 3.0 times in the lateral direction, and was heat-treated at 180° C. to obtain a biaxially drawn film e. The two-layer film was comprised of a polyester layer I of 15 μm in thickness and a polyester layer II of 10 μm in thickness, and possessed a total thickness of 25 μm. By using this two-layer film, a 350-g two-piece can was obtained in the same manner as in Example 1. Table 1 shows the results of evaluation. After the cola was preserved, corrosion developed on the BHR portion and on the bottom radius portion

We claim:

1. A draw-formed container obtained by draw-forming a laminated material of a metal and a resin film into a cup having a bottom, wherein the resin film comprises an upper surface layer of a copolymerized polyester (A) having a high molecular orientation derived from acid components of 85 to 97% of terephthalic acid and 3 to 15% of isophthalic acid, and ethylene glycol, and a lower layer consisting essentially of a copolymerized polyester (B) having a low molecular orientation derived from acid components of 84.5 to 96.5% of terephthalic acid and 3.5 to 15.5% of isophthalic acid, and ethylene glycol, the amount of the isophthalic acid in the copolymerized polyester (B) being larger than that of the copolymerized polyester (A) of the surface layer, and the surface layer having a double refraction method orientation degree (Δn) of not smaller than 0.02, said orientation degree (Δn) being represented by the following formula:

$$\Delta n = n_1 - n_2$$

wherein $n_1$ is a refractive index in the direction of a maximum orientation of the film, and $n_2$ is a refractive index in the direction of the thickness of the film.

2. A draw-formed container according to claim 1, wherein the copolymerized polyester (B) of the lower layer contains isophthalic acid in an amount which is larger by at least 0.5% than that of the copolymerized polyester (A) of the surface layer.

3. A draw-formed container according to claim 2, wherein the copolymerized polyester (B) of the lower layer is a copolymerized polyester having a melting point of 220° C. or above and a glass transition point of 65° C. or above.

4. A draw-formed container according to claim 2, wherein the copolymerized polyester (B) of the lower layer is a copolymerized polyester having a melting point which is lower by at least 0.5° C. than that of the copolymerized polyester (A) of the surface layer.

5. A draw-formed container according to claim 2, wherein the copolymerized polyester (B) of the lower layer has a double refraction method orientation degree (Δn) of 0.001 or above.

6. A draw-formed container according to claim 2, wherein the copolymerized polyester (B) of the lower layer is a copolymerized polyester having a melting point of 220° C. or above, which is lower by at least 0.5° C. than that of the copolymerized polyester (A) of the surface layer, and having a glass transition point of not lower than 65° C.

7. A draw-formed container according to claim 2, wherein the copolymerized polyester (B) of the lower layer is a copolymerized polyester having a melting point of 220° C. or more and a glass transition point of not lower than 65° C., and has a double refraction method orientation degree (Δn) of 0.001 or more.

8. A draw-formed container according to claim 1, wherein the copolymerized polyester (B) of the lower layer is a copolymerized polyester having a melting point of 220° C. or above and a glass transition point of 65° C. or above.

9. A draw-formed container according to claim 1, wherein the copolymerized polyester (B) of the lower layer is a copolymerized polyester having a melting point which is lower by at least 0.5° C. than that of the copolymerized polyester (A) of the surface layer.

10. A draw-formed container according to claim 1, wherein the copolymerized polyester (B) of the lower layer has a double refraction method orientation degree (Δn) of 0.001 or above.

11. A draw-formed container according to claim 1, wherein the copolymerized polyester (B) of the lower layer is a copolymerized polyester having a melting point of 220° C. or above, which is lower by at least 0.5° C. than that of the copolymerized polyester (A) of the surface layer, and having a glass transition point of not lower than 65° C.

12. A draw-formed container according to claim 1, wherein the copolymerized polyester (B) of the lower layer is a copolymerized polyester having a melting point of 220° C. or more and a glass transition point of not lower than 65° C., and has a double refraction method orientation degree (Δn) of 0.001 or more.

* * * * *